US009688209B2

(12) United States Patent
Cha et al.

(10) Patent No.: US 9,688,209 B2
(45) Date of Patent: Jun. 27, 2017

(54) HOLDING APPARATUS FOR MULTIPURPOSE

(71) Applicant: Hyundai Motor Company, Seoul (KR)

(72) Inventors: Dong Eun Cha, Suwon-si (KR); Hyun Gyung Kim, Hwaseong-si (KR); Seung Mok Lee, Osan-si (KR); Phil Jung Jeong, Yongin-si (KR); Soo Hyun Hyun, Gyeongju-si (KR)

(73) Assignee: Hyundai Motor Company, Seoul (KR)

(*) Notice: Subject to any disclaimer, the term of this patent is extended or adjusted under 35 U.S.C. 154(b) by 234 days.

(21) Appl. No.: 14/561,120

(22) Filed: Dec. 4, 2014

(65) Prior Publication Data
US 2016/0052463 A1 Feb. 25, 2016

(30) Foreign Application Priority Data

Aug. 19, 2014 (KR) .......................... 10-2014-0107781

(51) Int. Cl.
*B60R 9/048* (2006.01)
(52) U.S. Cl.
CPC .................................... *B60R 9/048* (2013.01)
(58) Field of Classification Search
CPC ............... B60R 9/048; Y10T 403/7105; Y10T 403/7129; Y10T 403/7135; Y10T 403/7147; A44B 11/005; A44B 11/22
USPC ....... 224/558, 567, 569, 570, 924; 248/74.3, 248/229.13, 229.17
See application file for complete search history.

(56) References Cited

U.S. PATENT DOCUMENTS

| 1,688,148 A * | 10/1928 | Martin ...................... B60Q 7/00 211/86.01 |
| 5,509,776 A * | 4/1996 | Specht .................... B60R 9/042 224/319 |
| 5,570,825 A | 11/1996 | Cona |
| 6,575,344 B2 * | 6/2003 | Nusbaum ................ B60R 9/048 224/525 |
| 6,634,609 B2 * | 10/2003 | Zheng ..................... A45B 11/00 248/277.1 |

(Continued)

FOREIGN PATENT DOCUMENTS

| EP | 2 212 156 A1 | 8/2010 | |
| FR | 382926 A * | 2/1908 | ............. B60R 9/048 |

(Continued)

*Primary Examiner* — Gary Elkins
(74) *Attorney, Agent, or Firm* — Morgan, Lewis & Bockius LLP

(57) ABSTRACT

A holding apparatus for multipurpose may include a rotation bar having an insertion groove formed at one end portion thereof, the insertion groove having a screw thread formed thereon, and a plurality of catching protrusions formed at the another end portion thereof along an outer circumference, a clamp having a screw groove, engaged with the screw thread, which is formed at an end portion side of the clamp which is separated or engaged with the screw thread of the rotation bar and preventing the separation by an end portion inserted into the insertion groove along a rotation axis of the rotation bar, and a grip member provided to another end portion of the rotation bar, including a fastening apparatus to be fastened to a target object, and preventing rotation of the rotation bar by being caught and coupled to the catching protrusions upon locking the fastening apparatus.

5 Claims, 5 Drawing Sheets

(56) References Cited

U.S. PATENT DOCUMENTS

| | | | | |
|---|---|---|---|---|
| 8,038,106 B2 * | 10/2011 | Magno, Jr. | ................ | F16B 2/10 |
| | | | | 248/228.1 |
| 8,206,069 B1 * | 6/2012 | Lindsey | .................. | B60P 3/079 |
| | | | | 410/3 |
| 8,393,506 B2 * | 3/2013 | Malm | ....................... | B60R 9/10 |
| | | | | 224/319 |
| 9,198,741 B2 * | 12/2015 | Morin | ....................... | A61C 7/36 |
| 2005/0104305 A1 * | 5/2005 | Chan | ......................... | B60R 9/10 |
| | | | | 280/7.11 |

FOREIGN PATENT DOCUMENTS

| | | |
|---|---|---|
| KR | 10-0886325 B1 | 2/2009 |
| KR | 10-1030722 B1 | 4/2011 |
| KR | 10-2014-0039889 A | 4/2014 |

* cited by examiner

HOLDING APPARATUS FOR MULTIPURPOSE

CROSS REFERENCE TO RELATED APPLICATION

The present application claims priority to Korean Patent Application No. 10-2014-0107781 filed Aug. 19, 2014, the entire contents of which is incorporated herein for all purposes by this reference.

BACKGROUND OF THE INVENTION

Field of the Invention

The present invention relates to a holding apparatus for multipurpose, and more particularly, to a holding apparatus for multipurpose used for a multi-carrier to fix various equipments including a bicycle.

Description of Related Art

In recent, in accordance with an increase in interest in a bicycle of the public, people willing to use the bicycle for various purposes are increasing. For example, there may be a purpose for simply driving a road surrounding a home, a purpose for using the bicycle as a means of transportation having a special purpose, and the like.

However, the trend using the bicycle as a leisure purpose in addition to the above-mentioned purposes occurs. Examples of the trend include purchasing a leisure bicycle, moving to a place far away from the home, and enjoying sports.

To this end, various means for loading the bicycle in a vehicle and moving, for example, a bicycle carrier has been provided and the above-mentioned means are known as various exemplary embodiments.

As such, the bicycle carrier according to the related art and even a multi-carrier capable of loading various equipments in addition to the bicycle are provided with a holder connecting the bicycle or a target object to be loaded with the carrier to fix the target object to the carrier. The holders according to the related art are configured so that a portion coupled to the bicycle and a portion coupled to the carrier are independently provided.

However, since the structure as described above is troublesome in that a manipulator should manipulate a plurality of locking units upon fixing the bicycle to the carrier and the manipulation is also not simple, a use thereof had been uncomfortable.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a holding apparatus for multipurpose in which a plurality of holders coupled to a carrier and a target object loaded on the carrier, respectively, are interworked with each other to allow the other to be locked when any one holder is locked.

According to various aspects of the present invention, a holding apparatus for multipurpose may include a rotation bar having an insertion groove formed at one end portion thereof, the insertion groove having a screw thread formed thereon, and a plurality of catching protrusions formed at the another end portion thereof along an outer circumference, a clamp having a screw groove, engaged with the screw thread, which is formed at an end portion side of the clamp which is separated or engaged with the screw thread of the rotation bar and preventing the separation by an end portion inserted into the insertion groove along a rotation axis of the rotation bar, and a grip member provided to another end portion of the rotation bar, including a fastening apparatus to be fastened to a target object, and preventing rotation of the rotation bar by being caught and coupled to the catching protrusions upon locking the fastening apparatus.

The clamp may further include a rod coupled to the end portion of the clamp to be protruded to the other end portion of the rotation bar and having the screw groove formed on an outer circumference surface thereof.

The insertion groove further may have a fastening groove formed therein so that the end portion of the clamp is inserted into an entrance portion and the rod is insertable from the entrance portion to the other end portion of the rotation bar, and the screw thread may be formed on an inner circumference surface of the fastening groove.

Another end portion of the clamp may include a pair of holding members having end portions which are rotatably coupled and other end portions which are separated from or engaged with each other, and the other end portions of the holding members may be protruded and inserted into the insertion groove.

The grip member may include a housing having the other end portion of the rotation bar accommodated in an end portion thereof, a strip having one end portion fixed to the housing, another end portion inserted into an inner side of the housing, and a plurality of protrusions formed along a length of the strip, and a locking lever rotatably coupled to the housing and having one end portion and another end portion which are respectively caught and coupled to a protrusion of the strip and the catching protrusion when being rotated by the locking.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
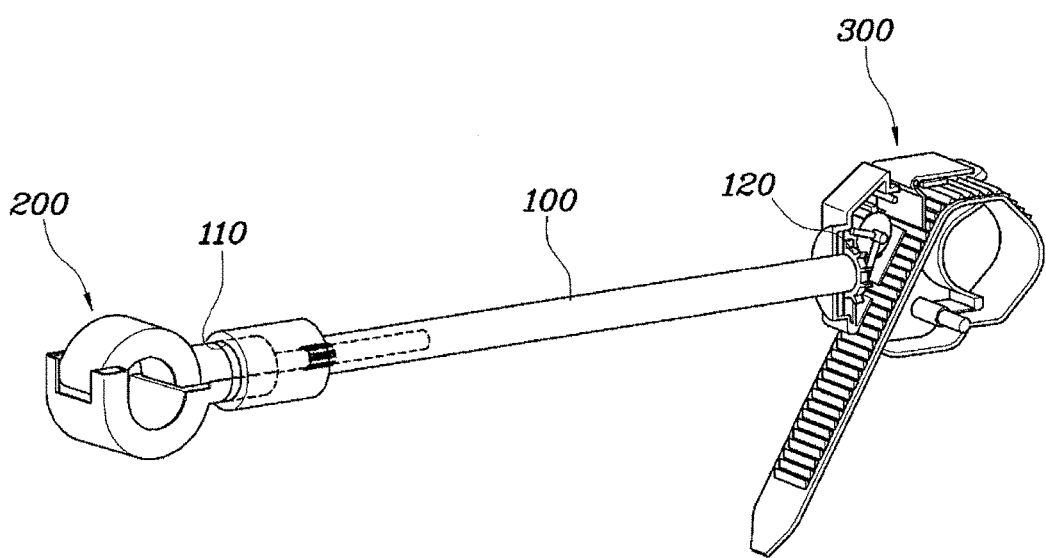
FIG. 1 is a configuration view of an exemplary holding apparatus for multipurpose according to the present invention.
Figure 2:
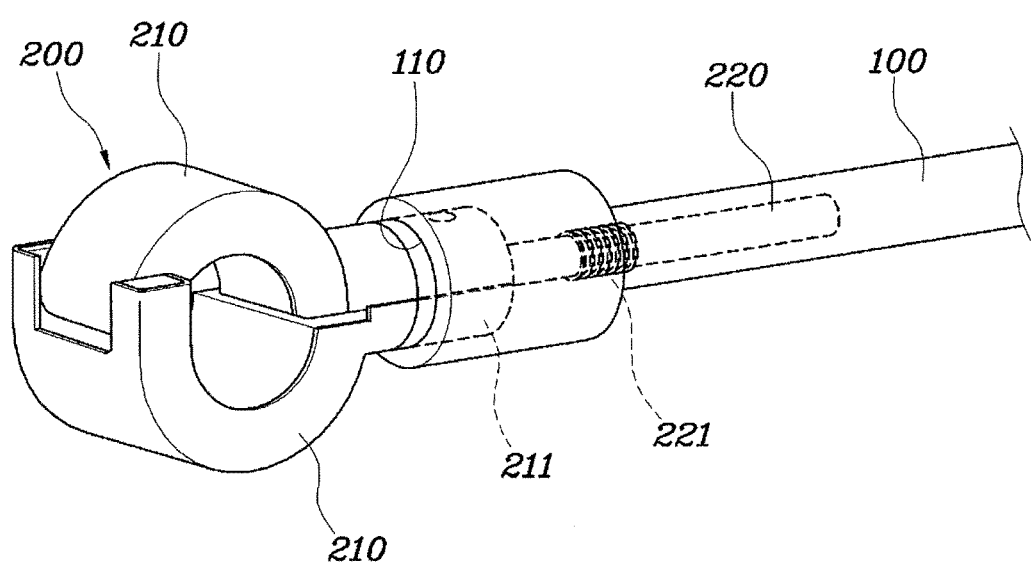
FIG. 2 is a view showing a state before a clamp according to the present invention is inserted into an insertion groove in the exemplary holding apparatus for multipurpose.
Figure 3:
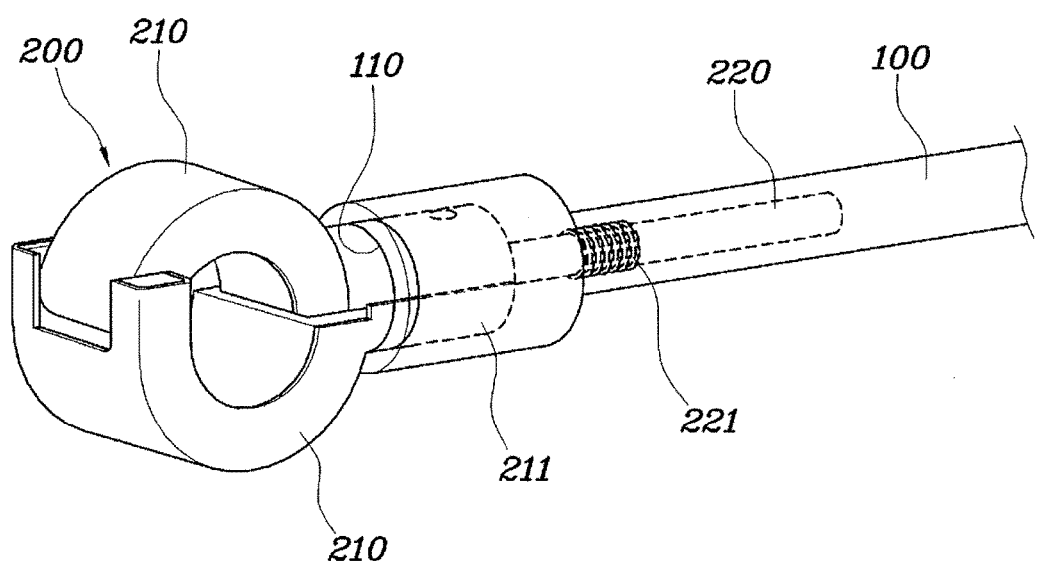
FIG. 3 is a view showing a state in which the clamp according to the present invention is inserted into the insertion groove.
Figure 4:
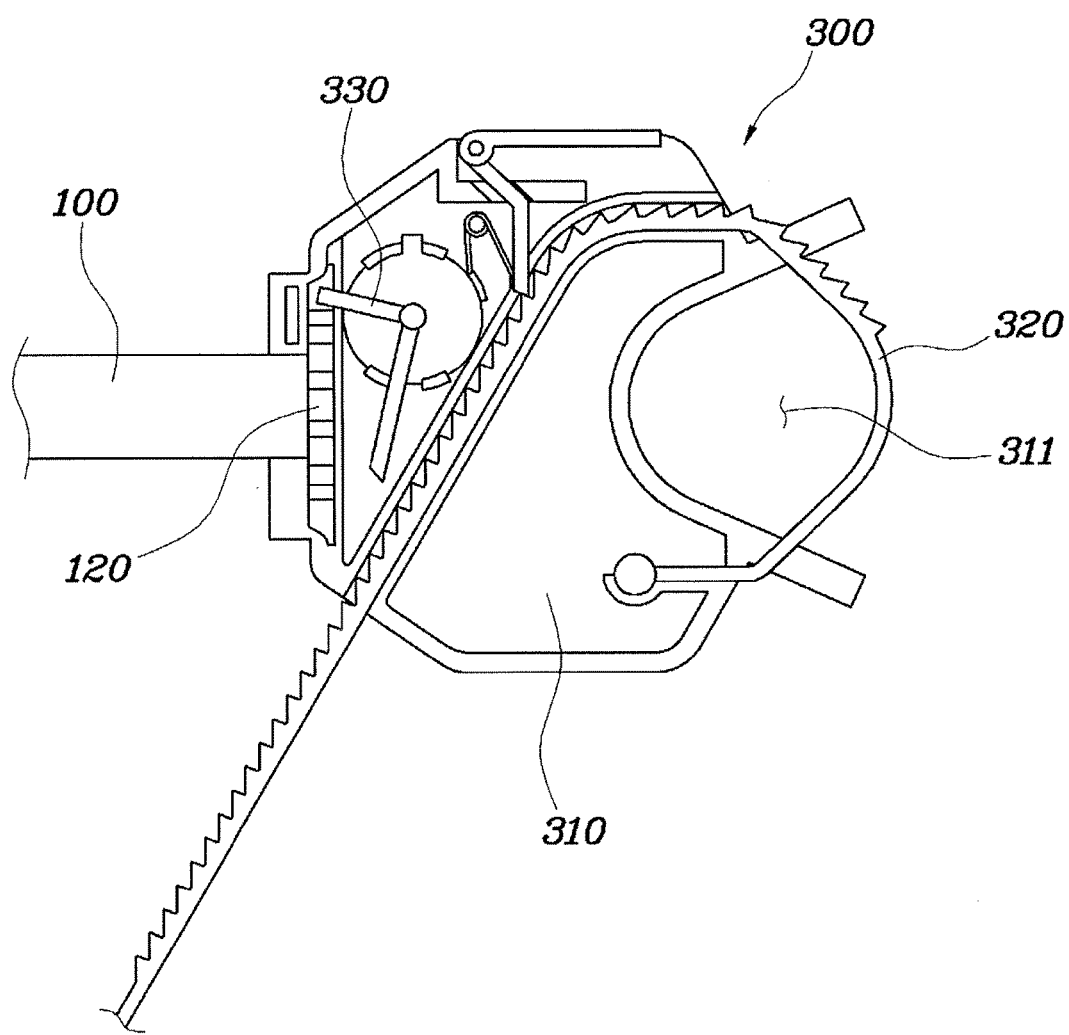
FIG. 4 is a view showing a state before a holding member according to the present invention is locked.
Figure 5:
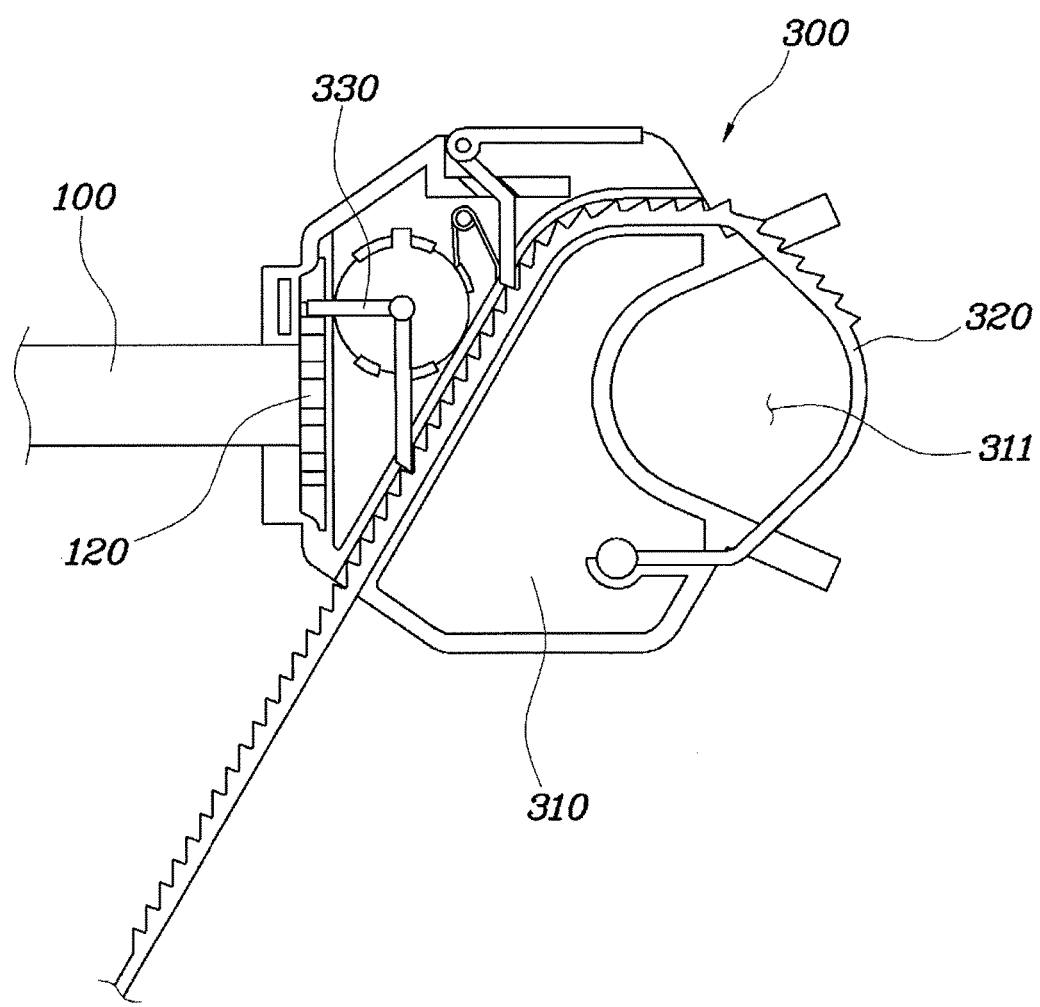
FIG. 5 is a view showing a form in which the holding member according to the the present invention is locked.

FIG. 1 is a configuration view of a holding apparatus for multipurpose according to various embodiments of the present invention, FIG. 2 is a view showing a state before a clamp according to various embodiments of the present invention is inserted into an insertion groove, FIG. 3 is a view showing a state in which the clamp according to various embodiments of the present invention is inserted into the insertion groove, FIG. 4 is a view showing a state before a holding member according to various embodiments of the present invention is locked, and FIG. 5 is a view showing a form in which the holding member according to various embodiments of the present invention is locked.

As shown in FIG. 1, the holding apparatus for multipurpose according to various embodiments of the present invention includes a rotation bar 100 having an insertion groove 110 formed at one end portion thereof, the insertion groove having a screw thread formed thereon and a plurality of catching protrusions 120 formed at the other end portion thereof along an outer circumference; a clamp 200 having a screw groove 221 engaged with the screw thread which is formed at an end portion side which is separated or engaged and preventing the separation by an end portion inserted into the insertion groove 110 along a rotation axis of the rotation bar 100; and a grip member 300 provided to the other end portion side of the rotation bar 100, including a fastening unit to be fastened to a target object, and preventing the rotation of the rotation bar 100 by being caught and coupled to the catching protrusions 120 upon locking the fastening unit.

Specifically, the holding apparatus for multipurpose according to various embodiments of the present invention may be preferably provided to a carrier installed in a vehicle to couple a bicycle to the carrier or a vehicle body, but is not limited thereto. For example, the holding apparatus for multipurpose according to various embodiments of the present invention may be used to fix various target objects loaded on the carrier and may also be used to fix various target objects as well as the carrier to a specific position.

Meanwhile, the clamp 200 includes a pair of holding members 210 having one end portion which is rotatably coupled and the other end portions which are separated from or engaged with each other and the other end portion of the holding member 210 may protrude and may be inserted into the insertion groove 110.

Specifically describing with reference to FIG. 2, the pair of holding members 210 have a groove formed in a central portion of a surface contacting each other to form a ring shape upon being engaged, and clamp a target object to be coupled in a central space to thereby be fastened to the target object.

In this case, the other end portion is engaged or separated based on a hinge-connected one end portion as an axis to become a state which is fastened or unfastened to the target object, and as the other end portion is protrudedly formed so as to be inserted into the insertion groove 110, it is prevented that when the other end portion is inserted into the insertion groove 110, they are separated from each other, thereby becoming a fastening-fixed state. Therefore, a shape of an inner circumference surface of the insertion groove 110 may be matched to a shape of an outer circumference surface of the other end portion of the holding member 210.

The other end portion of any one of the pair of holding members 210 may be more protruded than the other end portion of the other one of the pair of holding members and may then have the same or similar shape as the entire shape of the other end portion of the pair of holding members 210 at the protruded portion. The protruded shape 201 as described above allows the other end portion of the holding member 210 to be preferentially inserted into the insertion groove 110 to serve as a guide when the other end portion of the holding member 210 is inserted into the insertion groove 110, and enables the other end portions of the pair of holding members 210 to be naturally inserted without being caught when the other end portions of the pair of holding members 210 are inserted into the insertion groove 110 in a state in which they are engaged with each other.

Meanwhile, the clamp 200 may further include a rod 220 coupled to any one of the other end portions of the pair of holding members 210 in the protruded direction of the other end portions of the pair of holding members 210. The screw groove 221 may be formed in an outer circumference surface of the rod 220 along an axis direction of the rod 220 and may be wholly or partly formed in the rod 220.

As described above, since the screw groove 221 is formed in a separate rod 220, there is no need to form the screw thread in the outer circumference surface of the holding member 210 and it is possible to naturally and smoothly insert the other end portion of the holding member 210 into the insertion groove.

In addition, the fastening between the screw thread and the screw groove 221 may become more robust by forming the rod 220 and the holding member 210 using materials different from each other, such that the clamp 200 may be stably coupled to the rotation bar 100.

Although the screw thread and the screw groove are described by distinguishing them in the various embodiments of the present invention, this is merely to distinguish and describe screw thread shape formed in different members, and this does not mean that the screw thread and the screw groove are formed to necessarily have only the screw thread or the screw groove and it should be understood that the screw thread and the screw groove have a screw shape engaged with each other such as a bolt and a nut but not limited thereto.

Meanwhile, the rotation bar 100, which is a bar having the insertion groove 110 formed in one end thereof, may be formed in various shapes such as a cylinder shape, a polyprism shape, and the like, and may be a pipe shape having a hollow formed therein.

In addition, the insertion groove 110 has one end opened in an axis direction, such that an end portion of the clamp 200, that is, the other end portion of the holding member 210 may be moved in the axis direction of the rotation bar 100 along the insertion groove 110.

In addition, a fastening groove is further formed so that the rod 220 may be inserted from an opened entrance portion of the insertion groove 110 to the other end portion side of the rotation bar 100, and the screw thread is formed on an inner circumference surface of the fastening groove to support the rod 220 and enables the other end portion of the holding member 210 to be inserted into the insertion groove 110 when the rotation bar 100 is rotated as shown in FIG. 3. The screw thread and the screw groove 221 are preferably formed to have a range, a shape, and the like formed to correspond to each other.

Meanwhile, FIG. 4 is a view showing a state before a holding member according to various embodiments of the present invention is locked and FIG. 5 is a view showing a form in which the holding member according to various embodiments of the present invention is locked. As shown in FIG. 4 and FIG. 5, the grip member 300 may include a housing 310 having the other end portion of the rotation bar 100 accommodated in an end portion thereof; a strip 320 having one end portion fixed to the housing 310, the other end portion inserted into an inner side of the housing 310, and a plurality of protrusions formed along a length of the strip 320; and a locking lever 330 rotatably coupled to the housing 310 and having one end portion and the other end portion which are respectively caught and coupled to a protrusion of the strip 320 and the catching protrusion 120 when being rotated by the locking.

Specifically, a groove 311 on which the target object is seated is formed in one end portion of the housing 310 so as to be fastened to the target object similar to the clamp 200, and one side of the groove 311 may be opened and may be provided so that the strip 320 covers one side of the groove 311. As shown in FIG. 4 and FIG. 5, one end of the strip 320 is fixed to any one end portion side of both end portions of the groove 311 and an insertion path into which the other end of the strip 320 may be inserted across the groove 311 is provided to the other end portion side of the groove 311. It is preferable that the locking lever 330 is provided to the insertion path side so that one end portion the locking lever 330 may be coupled to the strip 320.

In addition, the housing 310 accommodates the catching protrusion 120 of the rotation bar 100 to prevent the rotation bar 100 from being separated from the housing 310, and the locking lever 330 is provided between the strip 320 and the catching protrusion 120, such that both end portions are caught and coupled to the catching protrusion 120 and the strip 320, respectively, when being rotated for the locking, thereby preventing the strip 320 from being separated in an inverse direction of an insertion direction and preventing the catching protrusion 120 from being rotated.

The locking lever 330 is connected to a separate rotation unit such as a knob provided to an exterior, such that it is rotated together with the rotation unit when a worker rotates the rotation unit in the locking direction to thereby form the locking as shown in FIG. 5 and it has a released catching and coupling with the catching protrusion 120 and the protrusion of the strip 320 as shown in FIG. 4 when being rotated in an inverse direction, thereby making it possible to perform a simultaneous locking or a simultaneous releasing.

When the locking lever 330 is fixed to the catching protrusion 120, the rotation of the rotation bar 100 is prevented. Therefore, when the clamp 200 is in a state in which it is coupled to an object to be fixed, the rotation bar 100 is not rotated itself, such that a stable locking state may be maintained without releasing the coupling. In addition, since the locking or the locking release may be performed by one work rotating the locking lever 330, a manipulation may be easily performed.

According to the holding apparatus for multipurpose having the structure as described above, since the clamp and the holding member are interworked with each other and the un-locking of the clamp is also prevented when the holding member is locked, there is no need to provide the plurality of locking units and the manipulation for the locking may also become simple.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A holding apparatus for multipurpose, comprising:
a rotation bar having an insertion groove formed at one end portion thereof, the insertion groove having a screw thread formed thereon, and a plurality of catching protrusions formed at the another end portion thereof along an outer circumference;
a clamp having a screw groove, engaged with the screw thread, which is formed at an end portion side of the clamp which is separated or engaged with the screw thread of the rotation bar and preventing the separation by an end portion inserted into the insertion groove along a rotation axis of the rotation bar; and
a grip member provided to another end portion of the rotation bar, including a fastening apparatus to be fastened to a target object, and preventing rotation of the rotation bar by being caught and coupled to the catching protrusions upon locking the fastening apparatus.

2. The holding apparatus of claim 1, wherein the clamp further includes a rod coupled to the end portion of the clamp to be protruded to the other end portion of the rotation bar and having the screw groove formed on an outer circumference surface thereof.

3. The holding apparatus of claim 2, wherein the insertion groove further has a fastening groove formed therein so that the end portion of the clamp is inserted into an entrance portion and the rod is insertable from the entrance portion to the other end portion of the rotation bar, and the screw thread is formed on an inner circumference surface of the fastening groove.

4. The holding apparatus of claim 1, wherein another end portion of the clamp includes a pair of holding members having end portions which are rotatably coupled and other end portions which are separated from or engaged with each other, and the other end portions of the holding members are protruded and inserted into the insertion groove.

5. The holding apparatus of claim 1, wherein the grip member includes:
- a housing having the other end portion of the rotation bar accommodated in an end portion thereof;
- a strip having one end portion fixed to the housing, another end portion inserted into an inner side of the housing, and a plurality of protrusions formed along a length of the strip; and
- a locking lever rotatably coupled to the housing and having one end portion and another end portion which are respectively caught and coupled to a protrusion of the strip and the catching protrusion when being rotated by the locking.

* * * * *